July 23, 1963      W. J. OWENS      3,098,645
LAMINATED TORSION BAR SUSPENSION
Filed Jan. 11, 1962      4 Sheets-Sheet 1
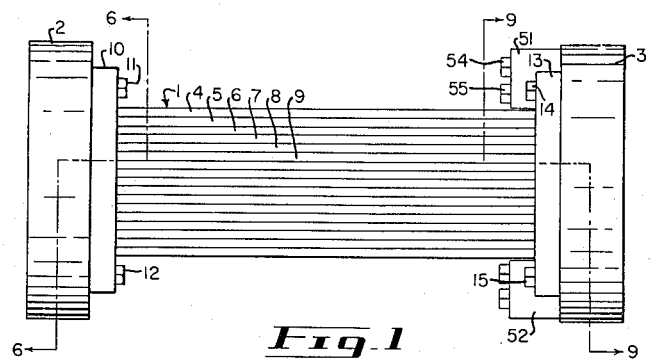
Fig. 1
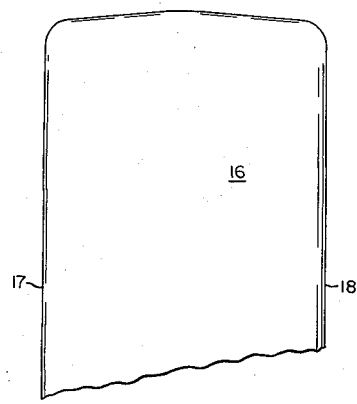
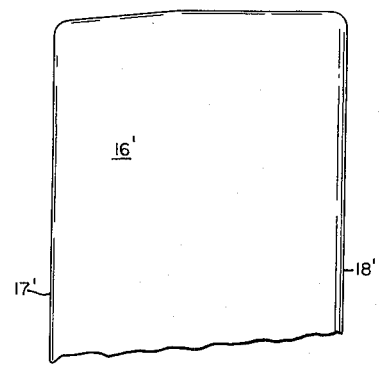

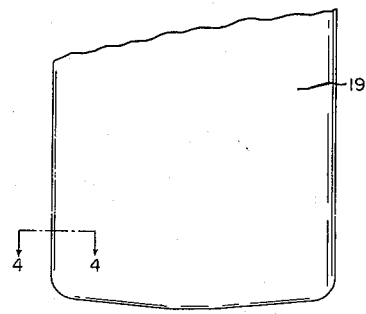

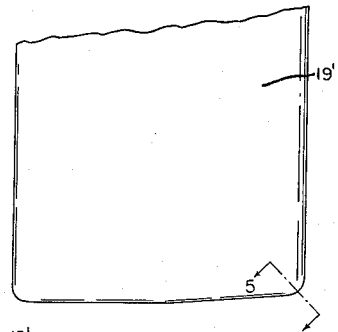
Fig. 4      Fig. 5

July 23, 1963 W. J. OWENS 3,098,645
LAMINATED TORSION BAR SUSPENSION
Filed Jan. 11, 1962 4 Sheets-Sheet 4

United States Patent Office 3,098,645
Patented July 23, 1963

3,098,645
LAMINATED TORSION BAR SUSPENSION
Walter J. Owens, Shrivenham, near Swindon, England, assignor to Her Majesty the Queen in right of Canada as represented by the Minister of National Defence
Filed Jan. 11, 1962, Ser. No. 165,613
Claims priority, application Canada Jan. 11, 1961
13 Claims. (Cl. 267—57)

This invention relates to vehicle suspension systems and more particularly to laminated torsion bars for use in such systems and means for securing and transmitting torsional forces to such bars.

Both solid and laminated torsion bars are well known in the vehicle suspension art, but although the laminated torsion bar offers many advantages such as space-saving and versatility, without undue sacrifice of its flexible characteristics, its use has been limited for two main reasons: the absence of suitable end-restraints or torsion-transmitting connecting structures, and the tendency of the torsion bar to be particularly subject to failure from fatigue in the immediate neighbourhood of the end-restraint. These factors are very closely related since torsional forces are transmitted from the end-restraint through the outside leaves of the torsion bar.

It is therefore an object of the present invention to provide an improved laminated torsion bar which will have a reduced tendency to fatigue in the immediate neighbourhood of the end-restraints, and improve such end-restraints.

To accomplish this and other objects, in the present invention, the inventor provides a laminated torsion bar in which the individual leaves are staggered with respect to the central transverse axis of the bar so that a plurality of bearing surfaces are provided at either end of the bar. The end-restraints are also provided with a plurality of bearing surfaces which engage with and bear upon the bearing surfaces of the torsion bar. In this manner the torsional forces transmitted from the end-restraints to the torsion bar are transmitted through intermediate and outer leaves instead of, as formerly, being transmitted solely through the outer leaves.

Accordingly this invention relates to a vehicle suspension system in which there is a combination comprising: a laminated torsion bar having a central transverse axis; and end-restraint means for securing said bar and transmitting torsional forces thereto; said bar comprising a first plurality of resilient leaves and a second plurality of resilient leaves, said leaves being arranged in a contiguous parallel relationship so that at least one leaf of said first plurality of leaves alternates with at least one leaf of said second plurality of leaves and the mid-points of said alternate leaves are disposed on opposed sides of said transverse axis.

The invention is illustrated by way of example, in the accompanying drawings in which:

FIGURE 1 is an external side view of one embodiment of the invention showing the relationship between a torsion bar of the invention and the end-restraints;

FIGURE 4 is a partial section along line 4—4 of FIGURE 2;

FIGURE 5 is a partial section along line 5—5 of FIGURE 3;

Figure 6:
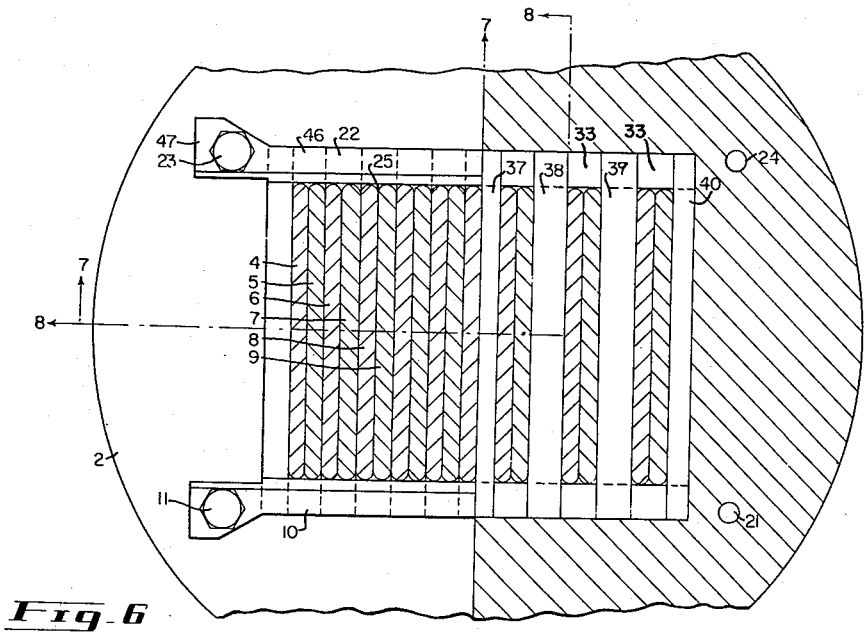
Figure 7:
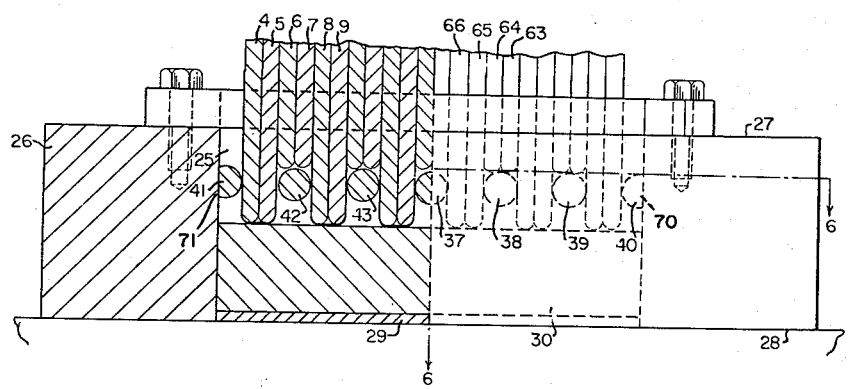
Figure 8:
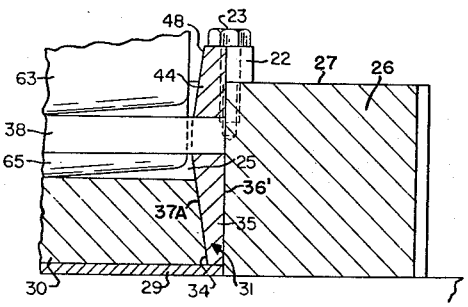
Figure 10:
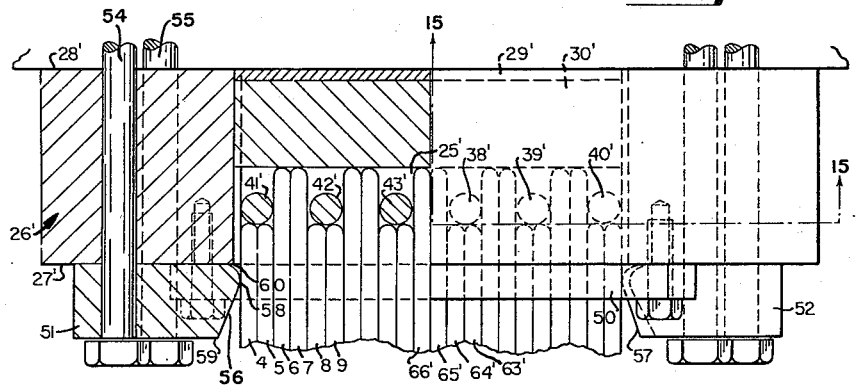
Figure 9:
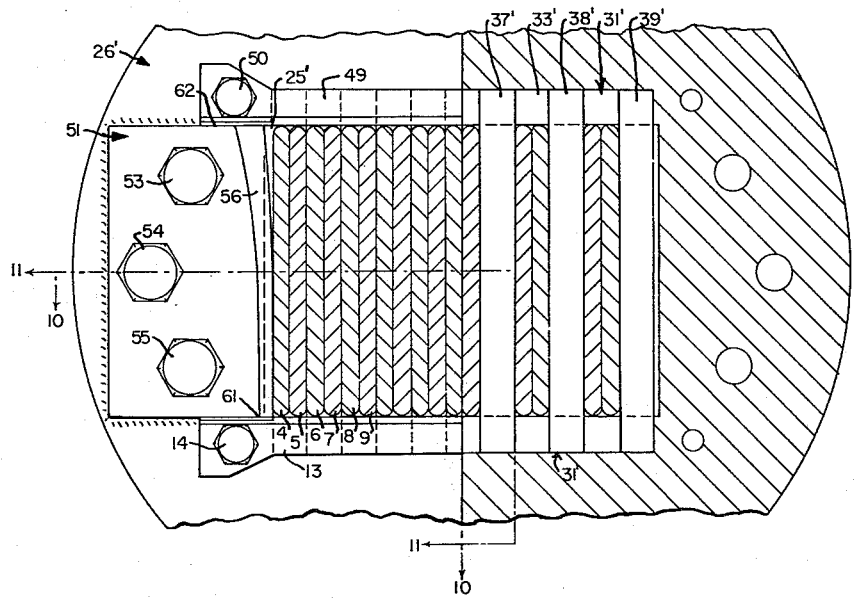
Figure 11:
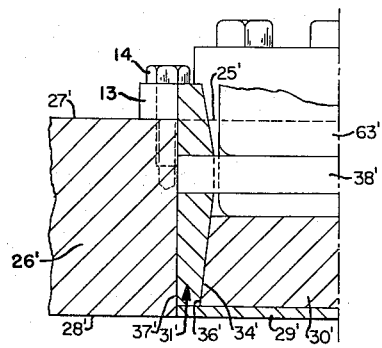
Figure 12:
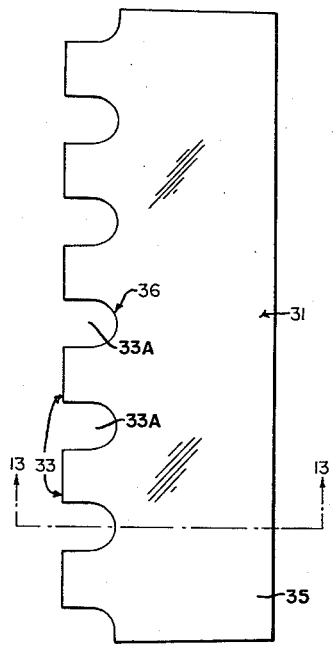
Figure 13:
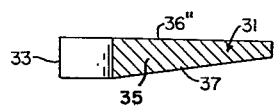

FIGURE 6 is a fragmentary section taken from line 6—6 towards end-restraint 2 of FIGURE 1, and also illustrates a half-section taken along line 6—6 of FIGURE 7;

FIGURE 7 is a half-section taken along line 7—7 of FIGURE 6;

FIGURE 8 is a fragmentary section taken along line 8—8 of FIGURE 6;

FIGURE 9 is a section taken along line 9—9 of FIGURE 1 and also illustrates a plan half-section taken from line 15—15 of FIGURE 10;

FIGURE 10 is a half-section along line 10—10 of FIGURE 9;

FIGURE 11 is a half-section along line 11—11 of FIGURE 9;

FIGURE 12 is a plan view of a preferred embodiment of a cross-bar support comb; and FIGURE 13 is a section taken along line 13—13 of FIGURE 12.

FIGURE 1 illustrates an external side view showing the general relationship between a laminated torsion bar and improved end-restraints in accordance with the invention.

The torsion bar and end-restraints have not been shown in any particular vehicle suspension since they may be used with substantially equal facility in any type of vehicle suspension system.

As shown in FIGURE 1 the torsion bar 1 comprises a plurality of individual leaves or lamina, some of which are indicated at 4, 5, 6, 7, 8 and 9, arranged in a stacked relationship. The precise arrangement of these lamina will be described later in this specification. Two end-restraints are indicated at 2 and 3. And keeper bars such as 10, mounted on end-restraint 2 by means of bolts 11 and 12, serve to maintain the adjacent end of the torsion bar in its correct relationship with end-restraint 2. Similarly, the other end of the torsion bar 1 is maintained in its correct relationship with end-restraint 3 by means of two longitudinally disposed keeper bars, one of which is shown at 13, and two laterally disposed steel blocks 51 and 52 secured to end-restraint 3 by bolts such as 54 and 55. Keeper bar 13 is secured to the end-restraint 3 by bolts 14 and 15.

FIGURES 2 and 4, and FIGURES 3 and 5 respectively, illustrate the structure of two alternative embodiments of the individual laminae or leaves of the torsion bar. In plan view both leaves 16 and 16' of FIGURES 2 and 3, respectively, have a substantially rectangular form and a longitudinal axis.

Figure 2:
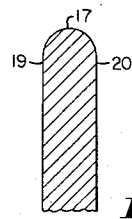
FIGURE 2 is a plan view of one embodiment of an individual leaf of a torsion bar.
Figure 3:
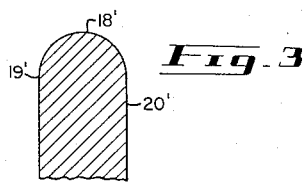
FIGURE 3 is a plan view of an alternative embodiment of an individual leaf of a torsion bar.

As will be seen from FIGURE 4, a partial section along line 4—4 of FIGURE 2, leaf 16 has a substantially flat upper surface 19, a substantially flat under surface 20 and the longitudinal sides 17 and 18 are rounded. Similarly FIGURE 5, a partial section along line 5—5 of FIGURE 3, shows that leaf 16' has a substantially flat upper surface 19', a substantially flat under surface 20', and longitudinal sides 17' and 18' are rounded. It will be understood that the surfaces of the lamina are ground and polished to reduce friction between the leaves, and between the leaves and the end-restraint. This polishing also helps to eliminate discrepancies due to inequality of the surface conditions of the leaves. It will be understood that other forms of surface treatment, such as peening may be used to reduce friction and metallic or non-metallic shims may be inserted between the leaves to further reduce friction. While, both forms of leaf may be used in one torsion bar it is preferable that only one form be employed in any one bar. However, it should be noted that in accordance with this invention each leaf in a torsion bar will have substantially equal dimensions.

Leaf 16 of FIGURE 2 is relieved at both ends to prevent binding by cutting back on both sides of the central longitudinal axis, whereas leaf 16' of FIGURE 3 while also being relieved at both ends is only cut back on one opposed side of the central longitudinal axis.

For convenience of description the end of the torsion bar adjacent end-restraint 2 will be termed the proximal end and the end of the torsion bar adjacent end-restraint 3 will be termed the distal end.

In FIGURE 6 a partial section along line 6—6 of FIGURE 1, the view has been rotated clockwise through 90°. As in FIGURE 1 one keeper bar is indicated at 10 and is secured to the end-restraint 2 by means of bolt 11. Hole 21 receives bolt 12 which secures the other end of keeper bar 10. A scond keeper bar 22 is secured to end-restraint 2 by two terminal bolts, one of which is shown at 23 and the second of which, although not shown, engages hole 24.

The structure of end-restraint 2 is shown in FIGURES 6, 7 and 8. As illustrated in these figures it comprises a block 26 of steel or similar material provided with a central rectangular socket 25 which has a width greater than the width of an individual leaf of the torsion bar and a length greater than the height or thickness of the torsion bar. In other words the socket is dimensioned so that when the torsion bar is mounted there are small clearances between the socket and the bar. The central socket 25 extends through block 26 from upper surface 27 to lower surface 28 and the opening of the socket on the lower surface is closed by a plate 29 of dimensions equal to the dimensions of the lower surface opening. It will be understood that suitable means are provided for securing block 26 to the vehicle chassis or suspension system and this arrangement of plate 29 permits a substantially flat surface to the opposed part of the vehicle. A steel block 30 is mounted in the central socket 25 on top of plate 29 so that the central longitudinal axis of block 30 and plate 29 are in the same plane.

Block 30 has a length substantially equal to the length of the socket and terminal sides extending normally to base plate 29. The width of block 30 is slightly less than the width of socket 25 and the longitudinal sides 34 of block 30 are inclined inwards toward its central longitudinal axis. However, the height of block 30 is less than the depth of the socket 25 so that the adjacent ends of each of the individual leaves which comprise the torsion bar may be received in the socket.

Two identical cross-bar support combs 31 are inserted, one on each longitudinal side, between block 30 and block 26. One of these combs is shown in FIGURES 12 and 13 and again in section in FIGURE 8. The support combs are, as shown in FIGURES 12 and 13, of unitary construction: each comprises a root portion 35 from the top surface of which project teeth 33 interspaced by rod-retaining gaps 33a. In this particular embodiment the leaves of the torsion bar are arranged in pairs with the width of each tooth is therefore substantially equal to twice the thickness of an individual leaf. Similarly, the width of the gap is also equal to twice the thickness of an individual leaf. However, it should be noticed that the bottoms of the gaps are rounded as at 36 to reduce friction between the support comb and transverse rods such as 40. The outer surface 36' of root 35, which when mounted abuts block 26, is substantially parallel thereto; and the inner surface 37a has a taper reversed from that of the longitudinal sides 34 of block 30. This arrangement ensures that block 30 is securely wedged in socket 25.

The cross-bar support combs 31 are identical and when mounted have their corresponding teeth and gaps aligned; and between each of the corresponding gaps steel bars such as 37, 38, 39, 42 and 43 are mounted to extend transversely across socket 25. Further bars are indicated at 40 and 41. These bars have a substantially circular cross-section with flats, such as 70 and 71 respectively on bars 40 and 41. These flats are on the sides abutting the wall of socket 25.

The two keeper bars 10 and 22 mounted on end-restraint 2 have similar structures. Keeper bar 22 has a main body portion which is substantially equal in length to socket 25, and two terminal flanges, one of which is shown at 47, are provided to accommodate bolts or securing means such as 23. The main body portion is generally L-shaped in cross-section so that when mounted one arm of the L extends down into socket 25 to close the gap between the teeth and secure the transverse rods. The other arm of the L rests on the upper surface 27 of block 26 and is secured thereto. This arrangement is illustrated in FIGURE 8.

The structure of end-restraint 3 is shown in FIGURES 9–11.

FIGURE 9 is a section of FIGURE 1 taken along line 9—9 and rotated through 90°. As illustrated by these drawings end-restraint 3 has a similar structure to end-restraint 2. It comprises a rigid steel block 26' with a central socket 25'. As in the case of socket 25, of end-restraint 2, socket 25' is so dimensioned that when the torsion bar 1 is mounted there are small clearances between the bar and the socket. Socket 25' extends through end-restraint 26' from the upper surface 27' to the lower surface 28' and a base plate 29' closes the opening on the lower surface 28' so that the end-restraint 3 presents a substantially continuous surface to the opposed part of the vehicle. A steel block 30' corresponding to block 30 of end-restraint 2 is mounted on base plate 29' in socket 25'. Block 30' has the same form as block 30; a length substantially equal to the length of socket 25', and terminal sides extending normally to base plate 29'. Again, the width of block 30' is slightly less than the width of socket 25' and the longitudinal sides 34' are inclined inwardly toward its central longitudinal axis. As in the case of block 30, the height of block 30' is less than the depth of socket 25' so that the adjacent ends of the individual leaves which comprise the torsion bar may be received in the socket.

As in end-restraint 2 cross-bar support combs 31' having the same structure as cross-bar support combs 31 are wedged between blocks 26' and 30'. However, support combs 31' are not identical to support combs 31. Because of the arrangement of torsion bar leaves fewer transverse rods are required in end-restraint 3 than in end-restraint 2.

Two keeper bars 13 and 49 are mounted on the upper surface 27' on opposed longitudinal sides of socket 25'. These bars have a length greater than the length of socket 25' and are terminally flanged to accommodate bolts such as 14 and 50 which secure them to block 26'. As shown in FIGURE 11 the keeper bars have a substantially L-shaped section, so that when mounted one arm of the L extends down into socket 25' closing the gaps of the support combs and securing the transverse rods. The other arm of the L rests on the surface 27' and is secured thereto in the manner shown.

Two normalized steel blocks 51 and 52 are mounted on surface 27' of block 26', one adjacent each lateral side of socket 25'. As shown in FIGURE 9 these blocks are mounted so that their sides 56 and 57 respectively, adjacent the torsion bar project over the lateral sides of socket 25' and bear upon the external leaves of the torsion bar.

To reduce friction, prevent binding and permit a small twisting movement sides 56 and 57 are compoundly curved. For example as shown in FIGURE 10 surface 56 or block 51 slopes outwardly from edge 59 to a point 58 adjacent its base and is then curved inwardly towards lower edge 60. At the same time, as illustrated in FIGURE 9 surface 56 curves from side 61 to side 62 in a direction away from the external leaf 4 of the torsion bar. Block 52 has a similar structure. It will of course be understood that alternative bearing means such as stub springs may be employed instead of the normalized steel blocks.

It is preferable that all leaves in a torsion bar will be of uniform dimensions. However, for convenience, in FIGURES 8 and 11 two alternative forms of the lateral sides of individual leaves have been illustrated to show the relationship of their ends with transverse rods and the end-restraints.

In the present embodiment the torsion bar comprises twenty-two individual leaves of equal dimensions. These leaves are arranged in pairs such as 4 and 5, 6 and 7, and 8 and 9 so that the ends of each pair are co-terminous and the ends of each pair of alternate leaves project beyond the ends of the adjacent pair of leaves. As shown in FIGURE 7 leaves 4 and 5 project beyond leaves 6 and 7, and leaves 8 and 9 project for an equal distance beyond leaves 6 and 7. It will be understood that when mounted the opposed surfaces of blocks 30 and 30' of end-restraints 2 and 3 are disposed apart a distance substantially equally to the length between the furthermost extremities of the torsion bar. Thus when the torsion bar 1 is mounted in end-restraint 2 the ends of all leaves comprising the bar will extend into socket 25. Leaves such as 4 and 5 however extend further than leaves such as 6 and 7 and their ends will contact block 30 and their upper and lower surfaces will contact the adjacent transverse rods such as 41 and 42.

At the other end of the torsion bar, FIGURE 10, since the leaves are of equal length, the ends of leaves such as 6 and 7 will project beyond the ends of leaves such as 4 and 5 for a distance equal to the distance beyond which leaves 4 and 5 projected at the other end. At this end the ends of leaves 4 and 5 bear upon rod 41' and leaves 6 and 7 extend between rods 41' and 42' to bear upon block 29'. It will now be seen that when a torque is applied to the torsion bar the load will be transmitted through a plurality of bearing surfaces instead of as formerly through the external bearing surfaces. One leaf will take the load from only four leaves instead of the whole pack no matter which way the torque is applied.

Although the invention has been described with particular reference to a torsion bar employing leaves in groups of four it will be understood that it may also be employed with various numbers of leaves comprising the groups. Furthermore, while the invention has also been described with reference to flat leaves it will also be understood that leaves of hexagonal cross-section may be used with the necessary modification to the end-restraints.

The embodiments of the invention in which an exclusive property or privilege is claimed are defined as follows:

1. In a vehicle suspension system the combination which comprises: a laminated torsion bar having a central transverse axis; and end-restraint means for securing said bar and transmitting torsional forces thereto; said bar comprising a first plurality of resilient leaves and a second plurality of resilient leaves, said leaves being arranged in a contiguous parallel relationship so that at least one leaf of said first plurality of leaves alternates with at least one leaf of said second plurality of leaves and the midpoints of said alternate leaves are disposed on opposed sides of said transverse axis.

2. In a vehicle suspension system the combination which comprises: a laminated torsion bar having a central transverse axis; and end-restraint means for securing said bar and transmitting torsional forces thereto, said bar comprising a first plurality of resilient leaves and a second plurality of resilient leaves, said first plurality of leaves being arranged in groups including at least two leaves and said second plurality of leaves being arranged in groups including at least two leaves, said groups of leaves being arranged in a contiguous parallel relationship so that groups of said first plurality of leaves alternate with groups of said second plurality of leaves and the midpoints of said alternate groups are disposed on opposed sides of said transverse axis.

3. The combination as claimed in claim 1 wherein said leaves have a flat form substantially rectangular in cross-section.

4. The combination as claimed in claim 1 wherein said individual leaves have a substantially hexagonal form in cross-section.

5. The combination as claimed in claim 3 wherein said leaves have a substantially rectangular form in plan view with at least one pair of opposed corners removed.

6. The combination as claimed in claim 3 wherein both pairs of opposed corners are removed.

7. The combination as claimed in claim 1 including shims disposed between the individual leaves.

8. In a vehicle suspension system having a laminated torsion bar with a first end and a second end, and comprising a first plurality of leaves and a second plurality of leaves arranged in a contiguous parallel relationship so that at the first end of said bar the ends of said first plurality of leaves project beyond the ends of the second plurality of leaves and at the second end the ends of said second plurality of leaves project beyond the ends of said first plurality of leaves; and end-restraint for securing and transmitting torsional forces to said bar comprising: a rigid housing furnished with a socket dimensioned to receive the first end of said bar, means providing bearing surfaces, mounted in said socket to abut on the ends of said second leaves and contact the sides of said first leaves, and means for securing said means providing said bearing surfaces in said socket.

9. An end-restraint as claimed in claim 8 in which the socket furnished in the end-restraint exceeds the dimensions of the torsion bar and means are mounted on the housing, external of and adjacent to said socket, to align the individual leaves of said bar with their respective bearing surfaces.

10. An end-restraint as claimed in claim 9 in which said means are two normalized steel blocks secured to said housing on opposed sides of said socket, said blocks each having a curved surface projecting over said socket to bear upon the outer leaves of said torsion bar.

11. An end-restraint as claimed in claim 8 in which said means providing bearing surfaces comprises a plurality of regularly spaced rods having their longitudinal axes normal to the longitudinal axis of the torsion bar.

12. An end-restraint as claimed in claim 11 in which said rods are generally circular in cross-section an outer pair thereof having flats adapted to contact a wall of the socket.

13. An end-restraint as claimed in claim 11 in which said means for securing said rods comprises a pair of rigid combs adapted to fit in said socket on opposed sides thereof, said combs each comprising a root, a plurality of teeth extending upwardly from said root, said teeth being regularly interspaced by a plurality of gaps each dimensioned to receive one of said rods, and a pair of rigid keeper bars adapted to be secured to said housing over said combs to close said gaps and secure said rods.

References Cited in the file of this patent

FOREIGN PATENTS

| | | |
|---|---|---|
| 613,044 | Great Britain | Nov. 22, 1948 |
| 962,282 | France | June 8, 1950 |
| 1,102,401 | France | Oct. 20, 1955 |
| 1,210,278 | France | Mar. 8, 1960 |